United States Patent
Wiseman

(10) Patent No.: US 12,397,703 B2
(45) Date of Patent: Aug. 26, 2025

(54) FULL DISPLAY MIRROR ASSEMBLY WITH A BLIND SPOT DETECTION SYSTEM

(71) Applicant: Gentex Corporation, Zeeland, MI (US)

(72) Inventor: Daryl A. Wiseman, Warwick (GB)

(73) Assignee: GENTEX CORPORATION, Zeeland, MI (US)

( * ) Notice: Subject to any disclaimer, the term of this patent is extended or adjusted under 35 U.S.C. 154(b) by 0 days.

(21) Appl. No.: 18/895,663

(22) Filed: Sep. 25, 2024

(65) Prior Publication Data

US 2025/0010788 A1  Jan. 9, 2025

Related U.S. Application Data

(63) Continuation of application No. 18/127,212, filed on Mar. 28, 2023, now Pat. No. 12,122,289.

(60) Provisional application No. 63/324,304, filed on Mar. 28, 2022.

(51) Int. Cl.
*B60Q 1/26* (2006.01)
*B60R 1/12* (2006.01)
*G08G 1/16* (2006.01)

(52) U.S. Cl.
CPC .......... *B60Q 1/2665* (2013.01); *B60R 1/1207* (2013.01); *G08G 1/167* (2013.01); *B60R 2001/1223* (2013.01); *B60R 2001/1253* (2013.01)

(58) Field of Classification Search
CPC ... B60Q 1/2665; B60R 1/1207; G08G 11/167
See application file for complete search history.

(56) References Cited

U.S. PATENT DOCUMENTS

| | | | |
|---|---|---|---|
| 5,928,572 | A | 7/1999 | Tonar et al. |
| 5,998,617 | A | 12/1999 | Srinivasa et al. |
| 6,020,987 | A | 2/2000 | Baumann et al. |

(Continued)

FOREIGN PATENT DOCUMENTS

| | | |
|---|---|---|
| JP | 2019034692 A | 3/2019 |
| KR | 20210084713 A | 7/2021 |

(Continued)

OTHER PUBLICATIONS

U.S. Appl. No. 61/704,869, filed Sep. 24, 2012, entitled "Image Manipulation for Automotive Rearview Device.".

(Continued)

*Primary Examiner* — Bryon T Gyllstrom
(74) *Attorney, Agent, or Firm* — Price Heneveld LLP; Brian James Brewer

(57) ABSTRACT

A full display mirror assembly for a vehicle includes an electro-optic assembly containing an electro-optic medium, a display module, and at least one imager module configured to capture a blind spot. A processor and a memory including instructions that, when executed by the processor, cause the processor to, in response to a detection of an object in the blind spot, generate a first warning indicia in a first region of the full display mirror assembly. The processor is further caused to, in response to a detection that a vehicle containing the full display mirror assembly is turning or about to turn towards the blind spot with the object, generate a second warning indicia in a second region of the full display mirror assembly by enlarging the first region.

20 Claims, 6 Drawing Sheets

(56) References Cited

U.S. PATENT DOCUMENTS

| | | | |
|---|---|---|---|
| 6,037,471 A | 3/2000 | Srinivasa et al. | |
| 6,137,620 A | 10/2000 | Guarr et al. | |
| 6,141,137 A | 10/2000 | Byker et al. | |
| 6,193,912 B1 | 2/2001 | Thieste et al. | |
| 6,249,369 B1 | 6/2001 | Theiste et al. | |
| 6,519,072 B2 | 2/2003 | Nishikitani et al. | |
| 7,532,149 B2* | 5/2009 | Banko | B60R 1/12 362/494 |
| 8,154,418 B2* | 4/2012 | Peterson | G06F 3/04886 348/148 |
| 8,201,800 B2* | 6/2012 | Filipiak | B60R 1/04 248/483 |
| 8,210,695 B2 | 7/2012 | Roth et al. | |
| 8,264,761 B2* | 9/2012 | Cammenga | B60R 1/072 359/266 |
| 8,643,931 B2 | 2/2014 | Cammenga et al. | |
| 8,646,924 B2 | 2/2014 | Roth et al. | |
| 8,814,373 B2* | 8/2014 | Steel | B60R 1/12 359/871 |
| 8,827,517 B2 | 9/2014 | Cammenga et al. | |
| 8,885,240 B2 | 11/2014 | Roth et al. | |
| 8,925,891 B2 | 1/2015 | Van Huis et al. | |
| 8,960,629 B2 | 2/2015 | Rizk et al. | |
| 9,174,577 B2 | 11/2015 | Busscher et al. | |
| 9,244,249 B2 | 1/2016 | Kim et al. | |
| 9,316,347 B2 | 4/2016 | Roth | |
| 9,505,349 B2 | 11/2016 | Fish, Jr. et al. | |
| 9,838,653 B2 | 12/2017 | Fish, Jr. et al. | |
| 10,664,115 B2* | 5/2020 | Lindahl | G06F 3/0489 |
| 10,739,591 B2 | 8/2020 | Lee et al. | |
| 10,999,559 B1* | 5/2021 | Pertsel | H04N 7/183 |
| 2010/0201816 A1* | 8/2010 | Lee | B60R 1/12 349/1 |
| 2010/0253541 A1* | 10/2010 | Seder | G08G 1/0962 340/905 |
| 2018/0134217 A1* | 5/2018 | Peterson | G08G 1/167 |
| 2021/0023983 A1* | 1/2021 | Ben Abdelaziz | B60Q 1/2665 |

FOREIGN PATENT DOCUMENTS

| | | | |
|---|---|---|---|
| WO | 9842796 A1 | 10/1998 | |
| WO | 9902621 A1 | 1/1999 | |

OTHER PUBLICATIONS

U.S. Appl. No. 61/707,625, filed Sep. 28, 2012, entitled "Integrated Spotter in Interior Electrochromic Mirror.".

* cited by examiner

FULL DISPLAY MIRROR ASSEMBLY WITH A BLIND SPOT DETECTION SYSTEM

CROSS-REFERENCE TO RELATED APPLICATIONS

This application is a continuation application of U.S. patent application Ser. No. 18/127,212 filed on Mar. 28, 2023, entitled "FULL DISPLAY MIRROR ASSEMBLY WITH A BLIND SPOT DETECTION SYSTEM," now U.S. Pat. No. 12,122,289, which claims priority to and the benefit under 35 U.S.C. § 119(e) of U.S. Provisional Application No. 63/324,304, filed on Mar. 28, 2022, entitled "FULL DISPLAY MIRROR ASSEMBLY WITH A BLIND SPOT DETECTION SYSTEM," the disclosures of which are hereby incorporated herein by reference in their entirety.

BACKGROUND OF THE DISCLOSURE

The present disclosure generally relates to a rearview device system, and, more particularly, a full display mirror assembly with a blind spot detection system.

SUMMARY OF THE DISCLOSURE

According to one aspect of the present disclosure, a full display mirror assembly for a vehicle includes an electro-optic assembly containing an electro-optic medium, a display module, and at least one imager module configured to capture a blind spot. A processor and a memory includes instructions that, when executed by the processor, cause the processor to, in response to a detection of an object in the blind spot, generate a first warning indicia in a first region of the full display mirror assembly. The processor is further caused to, in response to a detection that a vehicle containing the full display mirror assembly is turning or about to turn towards the blind spot with the object, generate a second warning indicia in a second region of the full display mirror assembly by enlarging the first region.

According to another aspect of the present disclosure, a full display mirror assembly for a vehicle includes an electro-optic assembly containing an electro-optic medium, a display module, and at least one imager module configured to capture a blind spot. A processor and a memory includes instructions that, when executed by the processor, cause the processor to, in response to a detection of an object in the blind spot, visually generate a first warning indicia. The processor is further caused to, in response to a detection that a vehicle containing the full display mirror assembly is turning or about to turn towards the blind spot with the object, generate a second warning indicia that is different than the first warning indicia.

According to yet another aspect, a method of detecting the presence of an object in a blind spot includes monitoring one or more blind spots with one or more imager modules. The method further includes, in response to a detection of an object in the blind spot, generating a video in a first region of the full display mirror assembly. The method further includes yet, in response to a detection that a vehicle containing the full display mirror assembly is turning towards the blind spot with the object, generating a video in a second region of the full display mirror assembly by enlarging the first region.

These and other features, advantages, and objects of the present disclosure will be further understood and appreciated by those skilled in the art by reference to the following specification, claims, and appended drawings.

DETAILED DESCRIPTION

Figure 1:
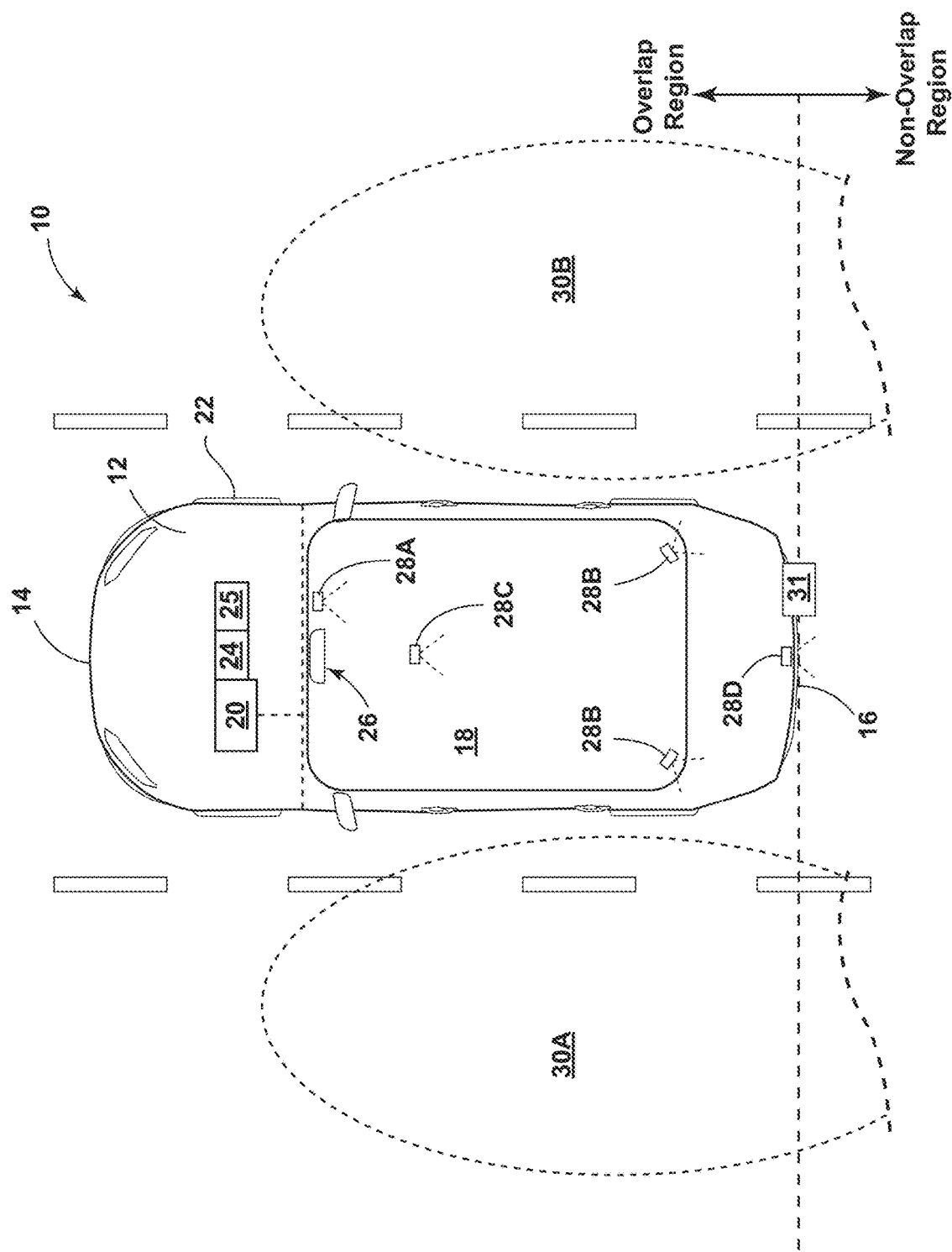
FIG. 1 is a top schematic view of a vehicle that includes a full display mirror assembly with a blind spot detection system, according to certain aspects of the present disclosure.

The present illustrated embodiments reside primarily in combinations of method steps and apparatus components related to a display mirror. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer of the display mirror, and the term "rear" shall refer to the surface of the element further from the intended viewer of the display mirror. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring initially to FIG. 1, reference numeral 10 generally designates a vehicle. The vehicle 10 may include any type of vehicle, for example, a passenger vehicle, a bus, a truck, a tractor, and/or the like. The vehicle 10 includes a body 12 having a front end 14, a rear end 16, and a cabin 18 located therebetween. The vehicle 10 further includes a steering system 20 that includes one or more tires 22. The steering system 20 may further include one or more sensors 24 that may determine a direction and a magnitude of a turning of the vehicle 10. The vehicle 10 further includes a full display mirror assembly 26 and at least one imager module 28A-28D. The steering system 20 may further include one or more mechanical or electrical inputs 25 from a driver, such as a turn signal actuation. The imager modules 28A-28D may be located in various positions on the vehicle 10, for example, an imager module 28A may be located near a front of the cabin 18, an imager module 28B may be located in a rear of the cabin 18, an imager module 28C may be located on a top surface of the vehicle 10, an imager module 28D may be located on or in the trunk of the vehicle 10, or combinations thereof. The vehicle 10 may include one or more blind spots 30A, 30B that are not visible or are not easily visible by a driver of the vehicle 10, via the traditional mirrors, such as rearview mirrors, side mirrors, and/or the like (not shown). At least one of the imager modules 28A-28D may be oriented specifically towards each of the blind spots 30A, 30B to capture image data thereof. In some embodiments, the image data may be extrapolated to determine the presence and location of an object. The imager modules 28A-28D may include a variety of technology including at least one image capturing camera that may be configured to capture images in the visible spectrum and/or outside the visible spectrum (e.g., infrared). At least one location detection sensor 31 may be located at or near the rear end 16 of the vehicle 10 to determine if an object has entered the blind spot 30A, 30B in an overlapping region of the vehicle 10 that would potentially cause a crash event if a driver of the vehicle 10 were to move the vehicle 10 in a direction of the blind spot 30A, 30B. However, it should be appreciated that the at least one location detection sensor 31 may be located anywhere on or in the vehicle 10. For example, the location detection sensor 31 may be located in one or more of the positions of the imager modules 28A-28D as described herein. The location detection sensor 31 may include LIDAR modules, radar modules, radio detection and sensing, short range detection modules, long range detection modules, the like, and/or combinations thereof, to determine the presence and location of an object. The location detection sensors 31 may be configured to capture presence data that includes whether or not an object has been detected in the blind spots 30A, 30B. The image data, presence data, and/or additional data (FIG. 4) can be extrapolated (e.g., via software) to determine the presence, categorization, distance, and/or location of at least one object (e.g., another vehicle on a roadway). It is contemplated that, in some embodiments, the location of the object may be extrapolated via the image data without requiring the location detection sensor 31.

Figure 2A:
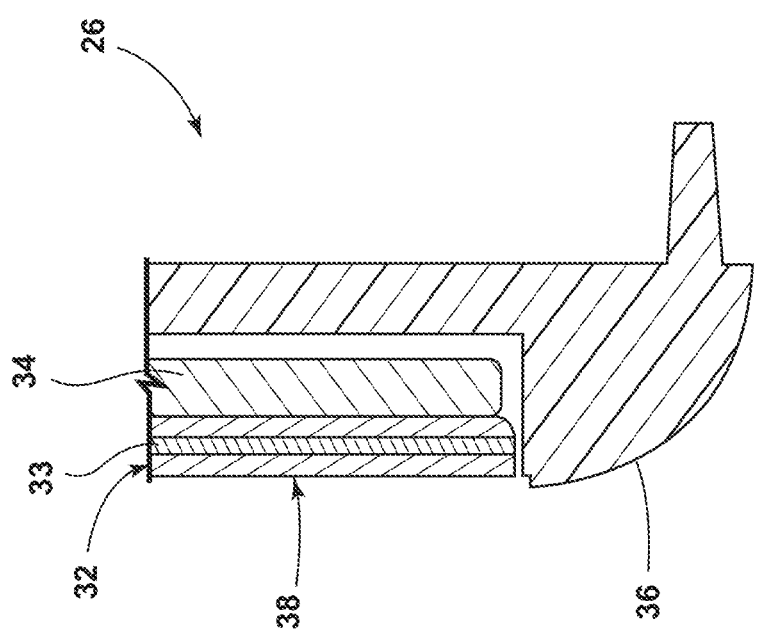
FIG. 2A is a side cross-sectional view of the full display mirror assembly from FIG. 1, according to certain aspects of the present disclosure.

With reference now to FIG. 2A, a side cross-sectional view of the full display mirror assembly 26 is illustrated. In some embodiments, the full display mirror assembly 26 includes a reflective state and a display state. In the reflective state, the full display mirror assembly 26 operates as a mirror, reflecting light at various wavelengths back towards an intended viewer. In the display state, the full display mirror assembly 26 relays information (e.g., an image, a video, a message, or a recommendation) based on image data captured from the at least one imager module 28A-28D, user inputs, presence data captured from the at least one location detection sensor 31, and/or other conditions. It should be appreciated that in the display state, certain regions may operate as a mirror simultaneously to certain regions displaying information. The full display mirror assembly 26 includes a partially reflective, partially transmissive element 32 (also referred to as a "electro-optic device" herein) and a display module 34 that is viewed through the electro-optic device 32. The full display mirror assembly 26 further includes a housing assembly 36 that shields and supports the electro-optic device 32 and the display module 34. The display module 34 may have one or more displays that include liquid crystal display (LCD), a light-emitting diode (LED), an organic light-emitting diode (OLED), plasma, digital light processing (DLP), or other display technology.

Figure 2B:
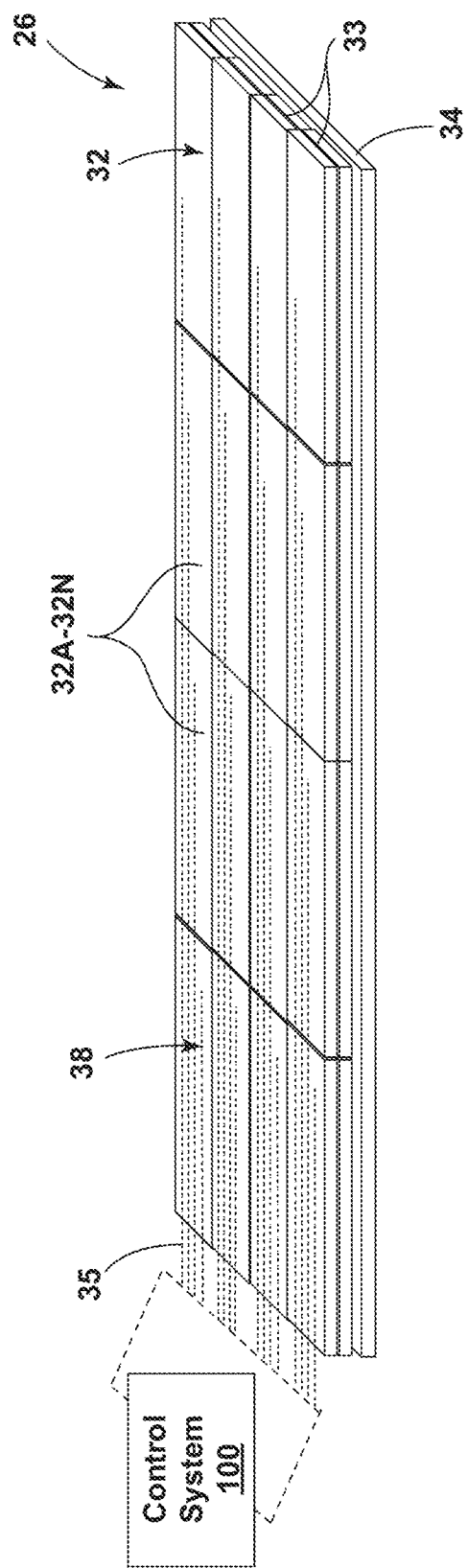
FIG. 2B is a perspective view of an electro-optic device that includes a plurality of segments and a display module located behind the electro-optic device according to certain aspects of the present disclosure.

With reference now to FIG. 2B, the electro-optic device 32 includes an electro-optic medium 33 (e.g., disposed between substrates and electrodes). The electro-optic device 32 may include a plurality of individually controlled segments 32A-32N. The number, size, and shape of the segments 32A-32N may vary. Each segment 32A-32N may be individually controlled by conductors 35 (e.g., pairs of traces) that extend to each segment 32A-32N. In some embodiments, each segment 32A-32N may be mechanically separated from adjacent segments 32A-32N. In this manner, each segment 32A-32N is configured as an independent and separate electro-optic device that contains electro-optic medium 33 that is electrically isolated from electro-optic medium 33 in adjacent segments 32A-32N. However, in other embodiments, each segment 32A-32N may be part of a single electro-optic device 32 and separated by a location of the conductors 35. In this manner, controlling which portion of the electro-optic device 32 changes states can be controlled by electro-activating select conductors 35 within regions of a non-separated electro-optic medium 33. In some embodiments, the display module 34 may define a display perimeter that is substantially equal in size to the electro-optic device 32. In other embodiments, the display perimeter may be smaller than the electro-optic device 32. In some embodiments, the display module 34 may include more than one display module 34 aligned with certain regions of the electro-optic device 32.

The electro-optic device 32 may include one or more electrochromic components with an electrochromic-type construction including the electro-optic medium 33 (e.g., an electrochromic medium), which includes at least one solvent, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical current is applied to the material, the color or opacity changes from a first phase to a second phase.

The electrochromic components as disclosed herein may be a single-layer, single-phase component, multi-layer component, or multi-phase component, as described in U.S. Pat. No. 5,928,572 entitled "Electrochromic Layer and Devices Comprising Same," U.S. Pat. No. 5,998,617 entitled "Electrochromic Compounds," U.S. Pat. No. 6,020,987 entitled "Electrochromic Medium Capable of Producing a Pre-selected Color," U.S. Pat. No. 6,037,471 entitled "Electrochromic Compounds," U.S. Pat. No. 6,141,137 entitled "Electrochromic Media for Producing a Pre-selected Color," U.S. Pat. No. 6,241,916 entitled "Electrochromic System," U.S. Pat. No. 6,193,912 entitled "Near Infrared-Absorbing Electrochromic Compounds and Devices Comprising Same," U.S. Pat. No. 6,249,369 entitled "Coupled Electrochromic Compounds With Photostable Dication Oxidation States," U.S. Pat. No. 6,137,620 entitled "Electrochromic Media With Concentration Enhanced Stability, Process for the Preparation Thereof and Use in Electrochromic Devices," and U.S. Pat. No. 6,519,072 entitled "Electrochromic Device"; and International Patent Publication Nos. 98/42796 entitled "Electrochromic Polymeric Solid Films, Manufacturing Electrochromic Devices Using Such Solid Films, and Processes for Making Such Solid Films and Devices," and 99/02621 entitled "Electrochrome Polymer Systems," which are herein incorporated by reference in their entireties. The electro-optic device 32 may also be any other element having partially reflective, partially transmissive properties. To provide electric current to the electro-optic device 32, electrical elements (e.g., a bus tape) may be provided on opposing sides of the device, to generate an electrical potential therebetween. The present disclosure may be used with a display mirror system such as that described in U.S. Pat. Nos. 9,505,349 and 10,739,591, which are hereby incorporated herein by reference in their entireties.

Figure 3A:
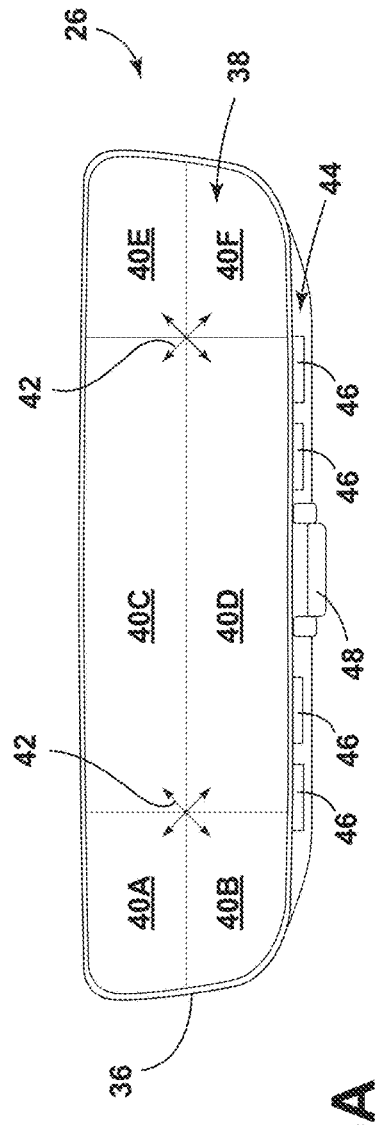
FIG. 3A is a front elevational view of the full display mirror assembly including a series of regions for displaying information from one or more imager modules, according to certain aspects of the present disclosure.

With reference now to FIG. 3A, the full display mirror assembly 26 (e.g., the electro-optic device 32) may include a front surface 38 with a plurality of regions. As a non-limiting example, the front surface 38 may include regions 40A-40E, which may be selectively activated. The regions 40A-40E may expand (e.g., enlarge) or contract (e.g., shrink) as indicated by arrows 42 based on various conditions. The number, shape, and size of the regions 40A-40E may vary. In some embodiments, the expansion or contraction of the regions 40A-40E may include activating additional adjacent regions 40A-40E. For example, region 40E may be expanded by also activating region 40C and/or 40F to form one of regions 40C+40E, 40E+40F, or 40C+40E+ 40F. For example, the segments 32A-32N may be substantially equal in size, number, shape, and arrangement of regions 40A-40E. In this manner, select ones of the segments 32A-32N may be electro-activated for increasing or decreasing the size of the area of the front surface 38 that functions as a display. In other embodiments, however, the expansion or contraction of the regions 40A-40E may include expanding a perimeter of the regions 40A-40E rather than activating additional regions 40A-40E. For example, the segments 32A-32N may be substantially greater in number and smaller in size than the arrangement of the regions 40A-40E. In this manner, the size of any particular one of the regions 40A-40E can be specifically controlled on a smaller scale than activating additional regions 40A-40E. The number and size of segments 32A-32N in the electro-optic device 32 may correlate to the number of sizes available for the individual regions 40A-40E. More particularly, one or more of the regions 40A-40E may be in a reflective state while one or more of the regions 40A-40E are simultaneously in a display state. Stated another way, one or more of the regions 40A-40E may display visual information (e.g., an image, a video, a message, a graphic, or a recommendation) based on image data captured from the at least one imager module 28A-28D, presence data captured from the at least one location detection sensor 31, user inputs, and/or other conditions while the other of the regions 40A-40E operate as a mirror.

Figure 3B:
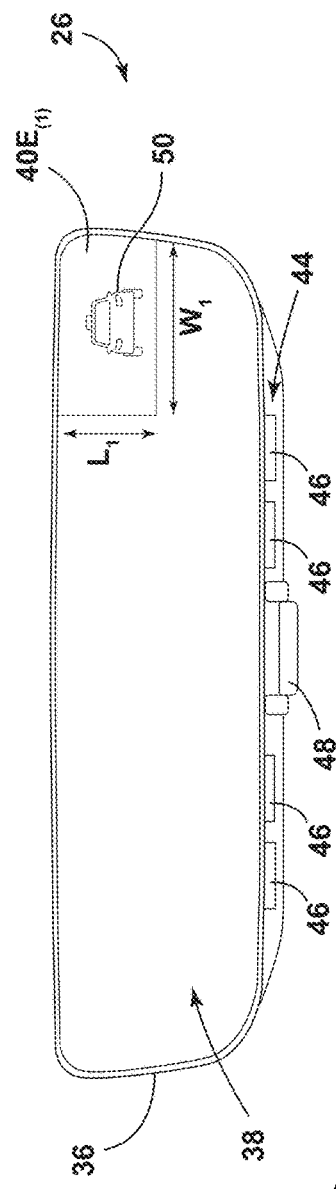
FIG. 3B is a front elevational view of the full display mirror assembly including a first warning indicia of the presence of an object in a blind spot of the vehicle in a scenario where the vehicle is not being turned towards the object, according to certain aspects of the present disclosure.
Figure 3C:
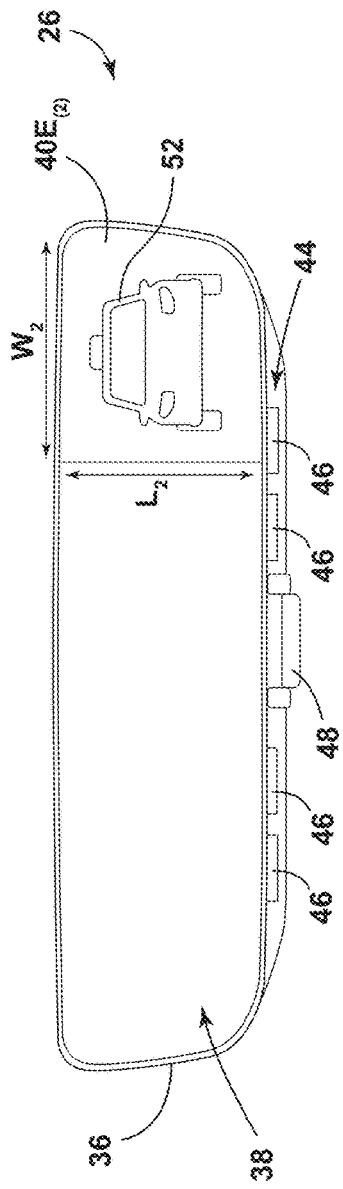
FIG. 3C is a front elevational view of the full display mirror assembly including a second warning indicia of the presence of the object in a blind spot in a scenario where the vehicle is being turned towards the object, according to certain aspects of the present disclosure.

As illustrated in FIGS. 3A-3C, the full display mirror assembly 26 may include a user interface 44 that includes a plurality of buttons 46. The buttons 46 may be used by a driver for inputting a number of settings and user preferences (e.g., switching between reflective and display states), the sizes and locations of the regions 40A-40E, types of information displayed, and/or the like. The full display mirror assembly 26 may further include an external switch 48 that is configured to at least one of the activate and deactivate of the display module 34, the electro-optic device 32, and/or alter a position of the electro-optic device 32 and display module 34 between a first position and a second position (e.g., to reduce glare).

FIG. 3B illustrates the full display mirror assembly 26 in a first scenario where the presence of an object (e.g., a second vehicle) is detected in one of the blind spots 30A, 30B of the vehicle 10 and there is no detection that the vehicle 10 is being turned towards the blind spot 30A, 30B with the object. In the first scenario, a first warning indicia 50 may be generated on a first region $40E_{(1)}$ that switches from a reflective state to a display state (e.g., via the underlying segments 32A-32N). For example, where the object has been detected in the blind spot 30B (FIG. 1), which is on a right side of the vehicle 10, the first region $40E_{(1)}$ may appear on a right side of the front surface 38 via switching to the display state and relaying the first warning indicia 50 (e.g., an image, a video, a graphic, a message, or a recommendation) captured by the one or more imager modules 28A-28D. In some embodiments, the first warning indicia 50 is a live video feed of the object as it is captured by the one or more imager modules 28A-28D. The first region $40E_{(1)}$ that displays the first warning indicia 50 may include a first width $W_1$ and a first length $L_1$ that define an area of the first region $40E_{(1)}$. The area of the first region $40E_{(1)}$ may be substantially in an upper or lower corner on the right side of the front surface 38 and spaced from other corners of the front surface 38. It should be appreciated that if an object is detected in the blind spot 30A, the first region may be provided on the left side of the front surface 38 (e.g., in regions 40A or 40B), rather than the right side, to improve situational awareness of the driver.

FIG. 3C illustrates the full display mirror assembly 26 in a second scenario where the presence of an object (e.g., the second vehicle) is detected in one of the blind spots 30A, 30B of the vehicle 10 and there is also a detection that the vehicle 10 is being turned towards the blind spot 30A, 30B with the object. In the second scenario, a second warning indicia 52 may be generated in a second region $40E_{(2)}$ that switches to the display state. In some embodiments, the second region $40E_{(2)}$ may be an enlargement of the first region $40E_{(1)}$ (e.g., by combining both regions 40E and 40F). For example, where the object has been detected in the blind spot 30B (FIG. 1), which is on a right side of the vehicle 10, the second region $40E_{(2)}$ may, likewise, appear on a right side of the front surface 38 and generate the second warning indicia 52 (e.g., an image, a video, a graphic, a message, or a recommendation) captured by the one or more imager modules 28A-28D. In some embodiments, the information is a live video feed of the object as it is captured by the one or more imager modules 28A-28D. The second region $40E_{(2)}$ may include a second width $W_2$ and a second length $L_2$ that define an area of the second region $40E_{(2)}$. The area of the second region $40E_{(2)}$ may be substantially larger than the area of the first region $40E_{(1)}$. For example, the second region $40E_{(2)}$ may extend between the upper and lower corner on the right side of the front surface 38. It should be appreciated that if an object is detected in the blind spot 30A, the second region may be provided on the left side of the front surface 38 (e.g., in regions 40A and 40B), rather than the right side, to improve situational awareness of the driver.

With reference to FIGS. 3A-3B, in some embodiments, the first and second warning indicia 50, 52 may be different in size, shape, or color. For example, the first warning indicia 50 may be smaller than the second warning indicia 52. In this manner, the first and second warning indicia 50, 52 may change in addition to or in lieu changes to the first and second regions $40E_{(1)}$, $40E_{(2)}$. The first and second warning indicia 50, 52 may include a graphic, such as a digital graphic of a vehicle, an image of a detected vehicle (or other object), or a real-time/close to real-time video of a detected vehicle (or other object). The color, size, or shape of the warning indicia 50, 52 may change as a result of the distance from the detected vehicle (or other object) or an indication (e.g., a turn signal or components of the steering system 20) that a driver of the vehicle 10 is about to turn into one of the blind spots 30A, 30B. For example, the warning indicia 50, 52 may gradually change the size in direct proportion to the distance of the object (e.g., become larger as the object becomes closer). The color of the warning indicia 50, 52 may change based on the indication that a driver of the vehicle 10 is about to turn into one of the blind spots 30A, 30B. In some embodiments, the second warning indicia 52 may be accompanied by an audible warning. It should be appreciated that the first and second warning indicia 50, 52 and regions $40E_{(1)}$, $40E_{(2)}$ are provided as merely one example. Changes to the warning indicia 50, 52 and the regions $40E_{(1)}$, $40E_{(2)}$ may be directly proportionate with a detected threat level (e.g., distance to the object or the indication of turning into one of the blind spots 30A, 30B). In this manner, it should be appreciated that there may be a series of differently sized regions between regions $40E_{(1)}$, $40E_{(2)}$ and a series of different sized, colored, or shaped warning indicias between the first and second warning indicia 50, 52.

The full display mirror assembly 26 may mount to an interior of the vehicle 10 with a mounting system such as that described in U.S. Pat. Nos. 9,244,249; 8,960,629; 8,814,373; 8,201,800; 8,210,695; 9,174,577, 8,925,891, and 9,838,653; and U.S. Provisional Patent Application No. 61/704,869, which are hereby incorporated herein by reference in their entirety. Further, the present disclosure may be used with a rearview packaging assembly such as that described in U.S. Pat. Nos. 9,316,347; 8,814,373; 8,646,924; 8,643,931; 8,264,761; and 8,885,240; and U.S. Provisional Patent Application Nos. 61/707,625, which are hereby incorporated herein by reference in their entirety. Additionally, it is contemplated that the present disclosure can include a bezel such as that described in U.S. Pat. Nos. 8,827,517; 8,210,695; and 8,201,800, which are hereby incorporated herein by reference in their entirety.

Figure 4:
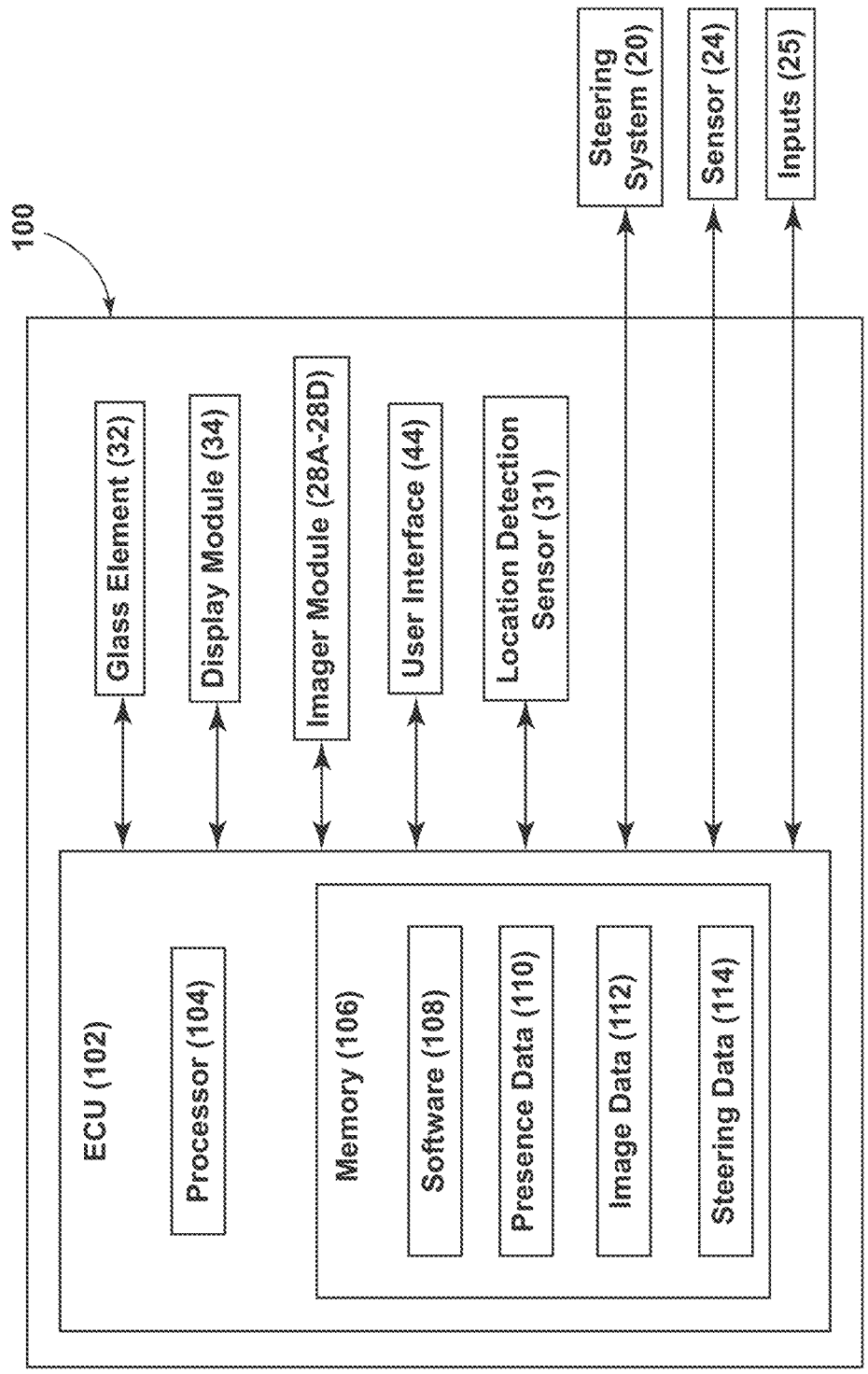
FIG. 4 schematically illustrates a control system of the full display mirror assembly, according to certain aspects of the present disclosure.

FIG. 4 illustrates a control system 100 associated, for example, with the one or more printed circuit boards ("PCB") in the full display mirror assembly 26 and/or other locations of the vehicle 10. The control system 100 may include an electronic control unit (ECU) 102. The ECU 102 may include a processor 104 and a memory 106. The processor 104 may include any suitable processor 104. Additionally, or alternatively, the ECU 102 may include any suitable number of processors, in addition to or other than the processor 104. The memory 106 may comprise a single disk or a plurality of disks (e.g., hard drives), and includes a storage management module that manages one or more partitions within the memory 106. In some embodiments, the memory 106 may include flash memory, semiconductor (solid state) memory or the like. The memory 106 may include Random Access Memory (RAM), a Read-Only Memory (ROM), or a combination thereof. The memory 106 may include instructions that, when executed by the processor 104, cause the processor 104 to, at least, perform the functions and method steps as described herein. The electro-optic device 32, the display module 34, the imager modules 28A-28D, components of the steering system 20, the one or more sensors 24, the mechanical or electrical inputs 25, the user interface 44, and/or the location detection sensor 31 may, therefore, be controlled, receive inputs, and/or transmit inputs in relation to the ECU 102. The ECU 102 may receive and/or the memory 106 may save software 108, presence data 110 captured by the location detection sensor 31, image data 112 captured by the imager modules 28A-28D, steering data 114 captured by the components of the steering system 20, the one or more sensors 24, and/or the mechanical or electrical inputs 25.

Figure 5:
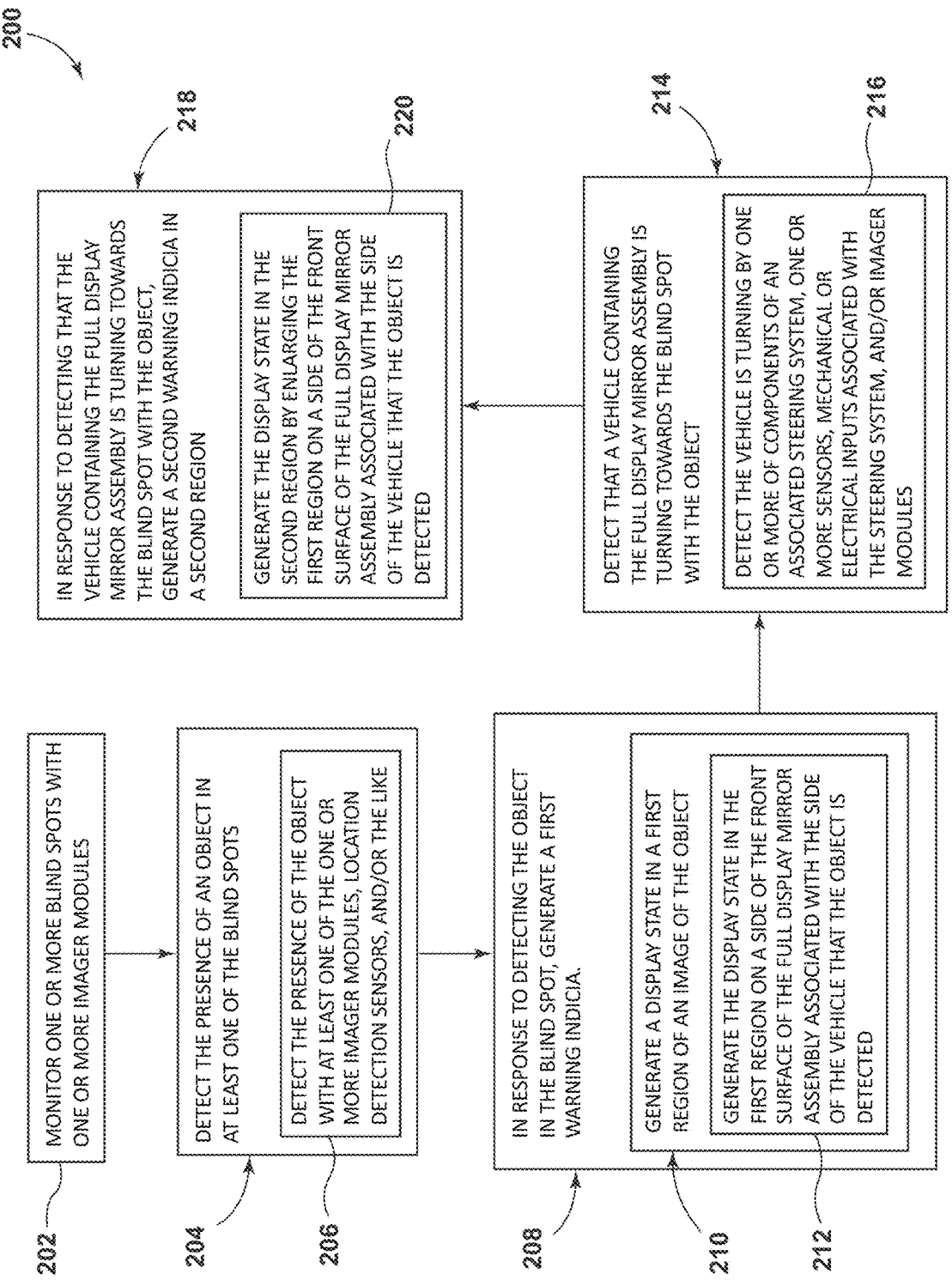
FIG. 5 is a flow diagram illustrating a method of detecting the presence of an object in a blind spot and providing at least one indicia on the full display mirror assembly, according to certain aspects of the present disclosure.

FIG. 5 illustrates a method 200 of detecting the presence of an object in a blind spot and providing at least one indicia on the full display mirror assembly. At 202, the method 200 includes monitoring one or more blind spots with one or more imager modules. For example, the processor 104 may be configured to receive information from the one or more imager modules 28A-28D and/or location detection sensors 31 as presence data 110 and/or image data 112.

With continued reference to FIG. 5, at 204, the method 200 includes detecting the presence of an object (e.g., the second vehicle) in at least one of the blind spots. For example, the processor 104 may be configured to extrapolate the presence data 110 and/or image data 112 via pattern (e.g., of the image data 112) and/or signal (e.g., of the presence data 110) recognition. Step 204 may include, at 206, detecting the presence of the object with at least one of the one or more imager modules, location detection sensors, and/or the like.

With continued reference to FIG. 5, at 208, the method 200 includes, in response to the detection of an object in the blind spot, generating a first warning indicia in a first region (e.g., on a front surface of the full display mirror assembly). For example, the processor 104 may be configured to switch the state of one or more segments 32A, 32N of the electro-optic device 32 to define a first region $40E_{(1)}$ and generate the first warning indicia 50 on the display module 34 (or a region of the display module 34 associated with the first region $40E_{(1)}$) aligned with the switched segments 32A, 32N. For example, step 208 may include, at 210, generating (e.g., with the processor 104) a display state in a first region of a video of the object. Step 210 may include, at 212, generating the display state in the first region with a first width and a first length defining an area of the first region on a side of the front surface of the full display mirror assembly associated with the side of the vehicle that the object is detected. For example, the processor 104 may be configured to switch the state of one or more segments 32A, 32N of the electro-optic device 32 and generate the first warning indicia 50 on a side of the full display mirror assembly 26 that is closest to the detected object.

With continued reference to FIG. 5, at 214, the method 200 includes detecting that the vehicle containing the full display mirror assembly is turning towards the blind spot with the object. For example, the processor 104 may be configured to receive information from the steering system 20, the one or more sensors 24, and/or the mechanical or electrical inputs 25 (e.g., the steering data 114) that the vehicle is turning towards the blind spot 30A, 30B with the object. The processor 104 may be further configured to receive information from the one or more imager modules 28A-28D and/or location detection sensors 31 that the vehicle 10 is merging into the blind spot 30A, 30B with the object. Step 214 may include, at 216, detecting (e.g., with the processor) that the vehicle is turning or about to turn by one or more of components of an associated steering system, one or more sensors (e.g., the location detection sensors), mechanical or electrical inputs associated with the steering system, and/or imager modules.

With continued reference to FIG. 5, at 218, in response to the detection that the vehicle containing the full display mirror assembly is turning towards the blind spot with the object, the method 200 includes generating a second warning indicia in a second region (e.g., by enlarging the first region and/or first warning indicia). For example, the processor 104 may be configured to switch the state of one or more additional segments 32A, 32N of the electro-optic device 32 to increase a viewing area to form a second region 40E$_{(2)}$ of the display module 34 and may further be configured to increase the size, change the color, or change the shape of the first warning indicia 50 into the second warning indicia 52. Step 218 may include, at 220, generating (e.g., with the processor) the display state in the second region with a second width and a second length defining an area of the second region that is substantially larger than the first region on a side of the front surface of the full display mirror assembly associated with the side of the vehicle that the object is detected (e.g., by switching states between additional segments 32A, 32N).

According to one aspect of the present disclosure, a full display mirror assembly for a vehicle includes an electro-optic assembly containing an electro-optic medium, a display module, and at least one imager module configured to capture a blind spot. A processor and a memory includes instructions that, when executed by the processor, cause the processor to, in response to a detection of an object in the blind spot, generate a first warning indicia in a first region of the full display mirror assembly. The processor is further caused to, in response to a detection that a vehicle containing the full display mirror assembly is turning or about to turn towards the blind spot with the object, generate a second warning indicia in a second region of the full display mirror assembly by enlarging the first region.

According to another aspect, the processor is further caused to generate the first region and the second region on a side of the full display mirror assembly closest to the blind spot that the object is detected.

According to another aspect, a location detection sensor determines if the object is in the blind spot.

According to another aspect, the at least one imager module includes more than one imager module that, together, are configured to capture a plurality of blind spots.

According to another aspect, a first warning indicia is smaller than a second warning indicia.

According to another aspect, a first warning indicia is a different color than a second warning indicia.

According to another aspect, a processor is further configured to switch an electro-optic medium between a reflective state and a display state.

According to another aspect, an electro-optic device includes a plurality of segments that can be independently switched between states.

According to another aspect, one or more of a plurality of segments define an outer perimeter that matches a first region.

According to another aspect, two or more of a plurality of segments define an outer perimeter that matches a second region.

According to another aspect, a processor is further configured to receive information from a steering system to detect if a vehicle containing a full display mirror assembly is about to turn.

According to another aspect, the received information from the steering system includes a turn signal.

According to another aspect, the received information from the steering system includes information from a sensor of a change in direction towards a blind spot.

According to another aspect, a processor is further configured to receive information from an at least one imager module or a location detection sensor that a vehicle is turning into a blind spot.

According to another aspect of the present disclosure, a full display mirror assembly for a vehicle includes an electro-optic assembly containing an electro-optic medium, a display module, and at least one imager module configured to capture a blind spot. A processor and a memory includes instructions that, when executed by the processor, cause the processor to, in response to a detection of an object in the blind spot, visually generate a first warning indicia. The processor is further caused to, in response to a detection that a vehicle containing the full display mirror assembly is turning or about to turn towards the blind spot with the object, generate a second warning indicia that is different than the first warning indicia.

According to another aspect, a first warning indicia is smaller than a second warning indicia.

According to another aspect, a second warning indicia is larger than a first warning indicia in proportion to proximity of a vehicle to an object in a blind spot.

According to another aspect, a first warning indicia and a second warning indicia include one of a digital graphic of a vehicle, an image of a vehicle, or a video of a vehicle.

According to yet another aspect, a method of detecting the presence of an object in a blind spot includes monitoring one or more blind spots with one or more imager modules. The method further includes, in response to a detection of an object in the blind spot, generating a video in a first region of the full display mirror assembly. The method further includes yet, in response to a detection that a vehicle containing the full display mirror assembly is turning towards the blind spot with the object, generating a video in a second region of the full display mirror assembly by enlarging the first region.

According to another aspect, the video is a live video feed of the blind spot.

It will be appreciated that embodiments of the disclosure described herein may be comprised of one or more conventional processors and unique stored program instructions that control one or more processors to implement, in conjunction with certain non-processor circuits, some, most, or all of the functions of a full display mirror assembly 26, as described herein. The non-processor circuits may include, but are not limited to, signal drivers, clock circuits, power source circuits, and/or user input devices. As such, these functions may be interpreted as steps of a method used in using or constructing a classification system. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, the methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation It will be understood by one having ordinary skill in the art that construction of the described disclosure and other components (unless otherwise stated) is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A full display mirror assembly comprising:
   a front surface extending between a left side and a right side;
   an electro-optic device including a first segment proximate the left side and a second segment proximate the right side, wherein the first segment includes an electro-optic medium that is electrically isolated from an electro-optic medium of the second segment;
   a display module viewable through the first and second segments;
   at least one imager module configured to capture a blind spot;
   a processor; and
   a memory including instructions that, when executed by the processor, cause the processor to:
      detect an object in a left side blind spot or a right side blind spot;
      in response to the detection of the object, determine if the object is in the left side blind spot or the right side blind spot; and
      visually generate a first warning indicia behind the first segment if the object is in the left side blind spot or visually generate the first warning indicia behind the second segment if the object is in the right side blind spot.

2. The full display mirror assembly of claim 1, further including a third segment proximate the first segment and a fourth segment proximate the second segment, wherein the third and fourth segments include an electro-optic medium that is electrically isolated from the electro-optic medium of the other segments.

3. The full display mirror assembly of claim 2, wherein the processor is further caused to:
   detect that a vehicle containing the full display mirror assembly is turning or about to turn towards the blind spot with the object; and
   visually generate a second warning indicia behind the first and third segments if the object is in the left side blind spot or visually generate the second warning indicia behind the second and fourth segments if the object is in the right side blind spot.

4. The full display mirror assembly of claim 3, wherein the second warning indicia includes an enlargement of the first warning indicia.

5. The full display mirror assembly of claim 1, wherein the processor is further caused to:
   detect that a vehicle containing the full display mirror assembly is turning or about to turn towards the blind spot with the object; and generate a second warning indicia behind the first segment if the object is in the left side blind spot or generate the second warning indicia behind the second segment if the object is in the right side blind spot.

6. The full display mirror assembly of claim 5, wherein the second warning indicia is visual and the first warning indicia is a different color than the second warning indicia.

7. The full display mirror assembly of claim 5, wherein the second warning indicia includes an audible warning.

8. The full display mirror assembly of claim 1, wherein the visual generation of the first warning indicia includes a digital graphic of the object.

9. The full display mirror assembly of claim 1, wherein the at least one imager module is configured to capture images of the blind spot, and the visual generation of the first warning indicia includes at least one of the captured images of the blind spot.

10. The full display mirror assembly of claim 9, including a location detection sensor to determine if the object is in the blind spot.

11. The full display mirror assembly of claim 10, wherein the detection sensor is located near a rear end of a vehicle containing the full display mirror assembly and is configured to detect if the object has entered a blind spot associated with an overlapping region of the vehicle.

12. The full display mirror assembly of claim 10, wherein the detection sensor is located proximate the at least one imager module.

13. A full display mirror assembly comprising:
a display module;
at least one of an imager module or a detection sensor configured to monitor a left hand blind spot and a right hand blind spot of a vehicle containing the full display mirror assembly;
a processor; and
a memory including instructions that, when executed by the processor, cause the processor to:
in response to a detection of an object in the left hand blind spot or the right hand blind spot with the imager module or the detection sensor, determine if the object is in the left hand blind spot or the right hand blind spot;
if the object is determined to be in the left hand blind spot, visually generate a first warning indicia in a left region of the full display mirror assembly or, if the object is determined to be in the right hand blind spot, visually generate the first warning indicia in a right region of the full display mirror assembly; and
in response to a detection that a vehicle containing the full display mirror assembly is turning or about to turn towards the blind spot with the object, generate a second warning indicia that is different than the first warning indicia.

14. The full display mirror assembly of claim 13, wherein the processor is further configured to receive information from a steering system to detect if the vehicle containing the full display mirror assembly is about to turn.

15. The full display mirror assembly of claim 13, wherein the second warning indicia includes an audible warning.

16. The full display mirror assembly of claim 13, wherein the second warning indicia includes an enlargement of the first warning indicia.

17. The full display mirror assembly of claim 13, further including a partially reflective, partially transmissive element and the display module viewable through the partially reflective, partially transmissive element.

18. A full display mirror assembly comprising:
a display module;
at least one of an imager module or a detection sensor configured to monitor a left hand blind spot and a right hand blind spot of a vehicle containing the full display mirror assembly;
a processor; and
a memory including instructions that, when executed by the processor, cause the processor to:
in response to a detection of an object in the left hand blind spot or the right hand blind spot with the imager module or the detection sensor, determine if the object is in the left hand blind spot or the right hand blind spot;
if the object is determined to be in the left hand blind spot, visually generate a first warning indicia in a left region of the full display mirror assembly or, if the object is determined to be in the right hand blind spot, visually generate the first warning indicia in a right region of the full display mirror assembly; and
in response to a detection that a vehicle containing the full display mirror assembly is moving relatively towards the object, visually generate a second warning indicia that that increases in size in proportion to the distance between the vehicle and the object.

19. The full display mirror assembly of claim 18, further including an electro-optic device with the display module viewable through the electro-optic device, the electro-optic device including a first segment in alignment with the left region and a second segment in alignment with the right region, wherein the first segment includes an electro-optic medium that is electrically isolated from an electro-optic medium of the second segment.

20. The full display mirror assembly of claim 19, wherein the first segment and second segment are configured to selectively operate as a mirror and the processor is further configured to:
generate the first warning indicia behind one of the first segment or the second segment associated with the object; and
configure the other of the first segment and the second segment associated to simultaneously operate as a mirror.

* * * * *